Jan. 19, 1965     D. C. JENNINGS     3,166,098
BALL VALVE
Filed Dec. 12, 1961
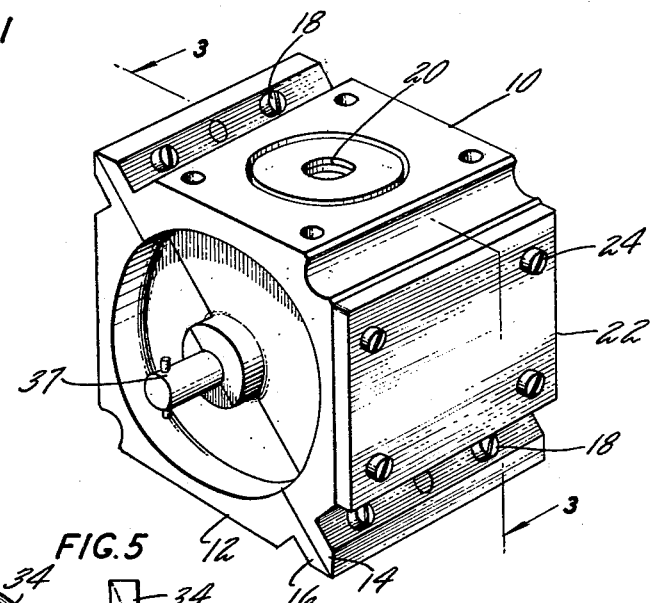
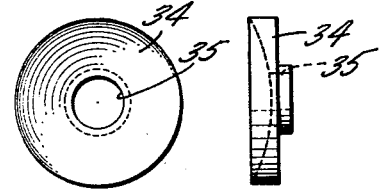
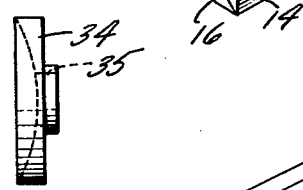
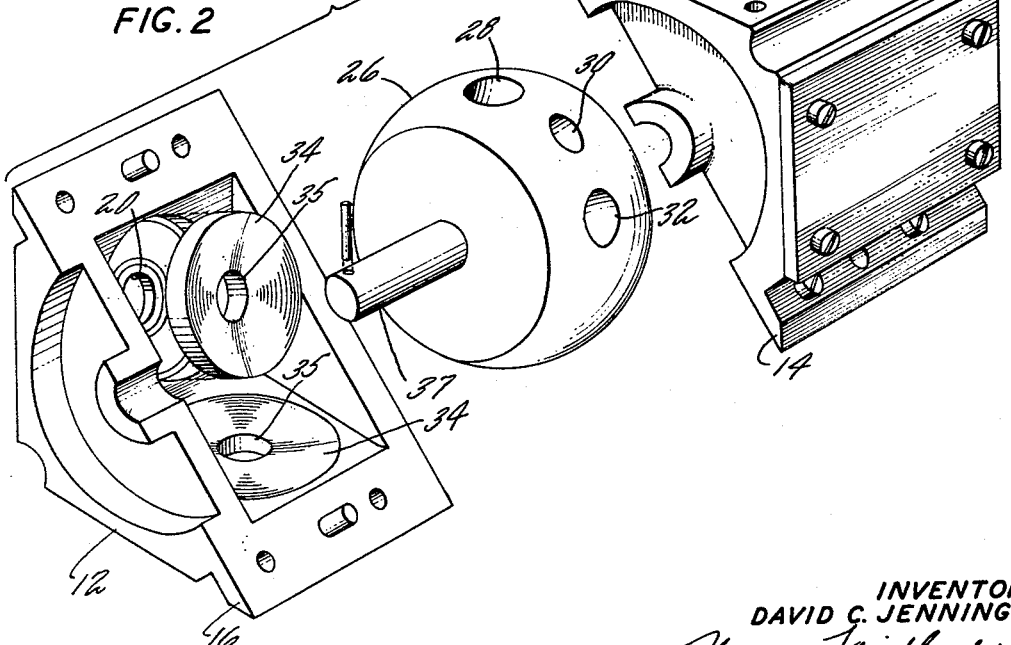
INVENTOR
DAVID C. JENNINGS
BY Norman Friedland
AGENT Jan. 19, 1965  D. C. JENNINGS  3,166,098
BALL VALVE
Filed Dec. 12, 1961  2 Sheets-Sheet 2

INVENTOR
DAVID C. JENNINGS
BY Norman Friedland
AGENT

United States Patent Office 3,166,0[...]
Patented Jan. 19, 1[...]

3,166,093
BALL VALVE
David C. Jennings, Windsor Locks, Conn., assignor to
United Aircraft Corporation, East Hartford, Conn., a
corporation of Delaware
Filed Dec. 12, 1961, Ser. No. 158,730
1 Claim. (Cl. 137—625.43)

This invention relates to valve construction and particularly to improvement for ball-type, multi-positional, multi-port valves.

It is an object of this invention to provide in a valve construction of the type described a spherical ball valve member supported by a plurality of combined bearing and seal members.

It is still a further object of this invention to provide a combined seal and bearing annular member surrounding the ports disposed within the inner wall of the valve housing about the longitudinal axis of the rotating ball member, wide enough to shut off the ports between adjacent operating positions.

It still is a further object of this invention to construct the valve housing in such a manner that the parting plane does not intersect any of the sealing members so as not to interfere with sealing and to afford easy accessibility for assembly and disassembly reasons.

It is still a further object of this invention to provide in a valve as described a construction which is being characterized as being relatively inexpensive to manufacture, highly reliable, while affording a high ability to seal yet capable of being put through rugged use.

It is still a further object of this invention to provide in the valve as described the combined functions of valve closure and opening for interconnecting more than two ports formed in the housing. The valve is capable of performing the shutoff or closure function by rotating the valve either in a unidirection or oscillating the valve in opposing directions.

I have found that my invention has particular application in systems where it is desirable to achieve a high degree of sealing. The system disclosed in the W. Arnoldi patent application Serial No. 104,892 filed on April 24, 1961 assigned to the same assignee is an example of where my invention finds particular utility. In this particular system, some of the paths which the valve must direct fluid flow is connected to vacuum. Tests have been conducted to determine the ability of the valve to seal fluid from adjacent substantially vacuum areas and these tests indicated that the amount of leakage evidenced around each seal was negligible.

These and other objects of this invention will become readily apparent from the detailed description of the drawings in which:

FIGURE 1 is an assembled perspective view of the valve.

FIGURE 2 is an exploded view in perspective of FIG. 1.

FIGURE 4 is a plan view of the combined bearing and seal member.

FIGURE 5 is a side elevation of the combined bearing and seal member.

Figure 3:
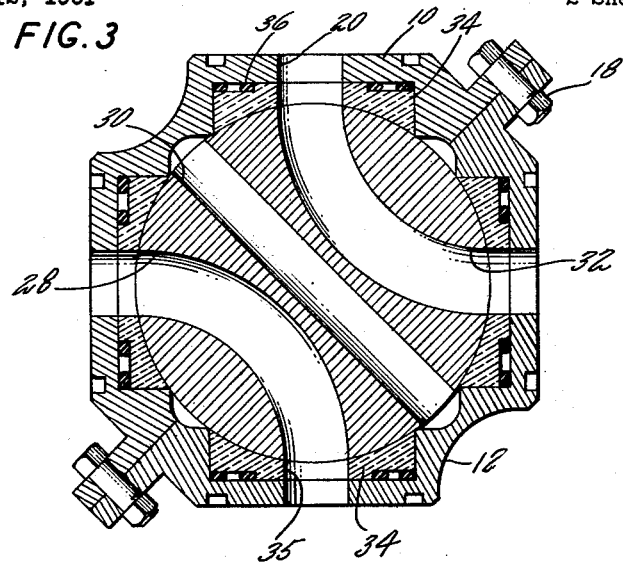
FIGURE 3 is a cross-sectional view taken along the sectional line 3—3 of FIG. 1.

Referring to FIGURES 1 through 5, the valve housing is formed by two outer casings 10 and 12 each carrying inner flange members 14 and 16 respectively. A plurality of holes are formed in the flange for receiving adequate securing members such as nut and bolt assembly 16. A plurality of ports are formed in the housing as indicated by numeral 20. For illustration purposes, but by no m[...] by way of limitation, the valve described hereinbel[...] a three-position, four-port valve, having a blocking for converting the valve to a three-position, three valve. The blocking plate 22 is merely illustrate show the simplicity required to convert the valve fr[...] four-port to a three-port valve. The valve plate ma mounted to the valve housing by a plurality of sect screw members 24.

In its illustrated embodiment, each casing is form[...] define a hollow section taking the general shape of half of a rectangular parallel-piped so that upon as bling both casings, the two halves form a rectan[...] parallel-piped shaped cavity portion for receiving the like member 26, although in its preferred embodimen casing halves would be cast into more closely confor[...] contours. A plurality of passages 28, 30 and 32 formed in the ball-like member for aligning with the [...] formed in the casing and directing the flow of fluid t[...] through to a plurality of externally connected pip[...] passageways (not shown). A recess surrounding ea[...] the ports is formed in the inner surface of the housin[...] receiving the dual function seal and bearing memb[...] seat 34. The annularly shaped seats incorporate a cave spherical surface complementing the spherical pheral surface formed on the ball member 26. M such as O rings or springs, generally indicated by num 36, surrounding the seat may be disposed between seat and inner wall of the housing forcing the seat to against the ball, or alternatively the seat may be [...] posed of a sufficiently resilient material to make auxiliary springs unnecessary. A boss extending from seat on the back side supports one portion of the sm O ring. This assures that the seat adequately con the ball at a sufficient pressure level so as to obtain quate sealing. A shaft 37 extending centrally from ball member protrudes through the casing so that r[...] movement imparted thereto will control the angular tion of the ball and therefore interconnect the va[...] ports or shut them off. The spacing between the sageways on the peripheral surface of the ball is suffi[...] to afford adequate sealing contact between the ope 35 formed in the seat and the spherical surface of the when the ball is in the position intermediate between necting adjacent ports in the housing. It will be rea[...] from the foregoing that the ball is supported by the [...] as distinct from being supported by the shaft. In manner, no sealing or pressure load is imposed on shaft but only torque while changing positions. It further be realized that the adjacent area between passages is sufficient to afford a shutoff function so this function may be obtained if the valve is rotate either a unidirection or oscillated.

The seats may be made from any adequate mat such as Teflon, buna N, neoprene, metal, etc. The n rial selected should employ a degree of compressi[...] and resilience so that when contacting the spherical face of the ball, it will fit closely to the same to pr[...] adequate sealing characteristics. Materials such as n which do not exhibit the same degree of compressi[...] as the other materials mentioned would necessitate use of a backup spring or O ring as described abo[...] provide the proper snugness that the seal must ha[...] relation to the ball, leakage between seat and casin[...] ing prevented by the same O ring or spring. The [...] ing may also be made from any suitable material su[...] metallic substances, synthetics and the like.

Figure 6:
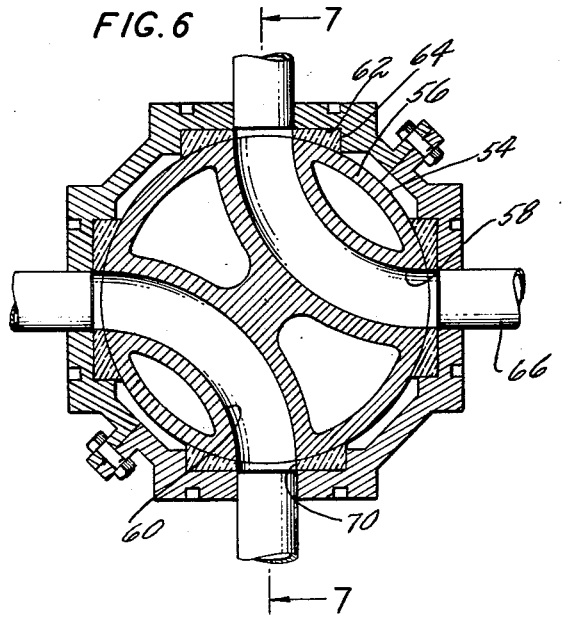
FIGURE 6 is a sectional view illustrating a second preferred embodiment.
Figure 7:
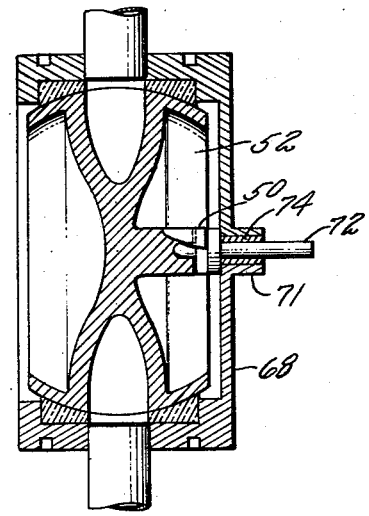
FIGURE 7 is a sectional view taken along line 7—7 of FIG. 6.

FIGURES 6 and 7 illustrate a modification of thi vention, and since details and functions are substan[...] identical to the structure shown in FIGURES 1 throu[...] for convenience the detailed description thereof wi omitted. In the interests of saving weight and co[...]

vice described in the foregoing, much of the struc-
 shown in connection with these aforementioned fig-
may be cast as opposed to machined. The only
ning requirement might be in forming the spherical
e of the wall, the recesses for the seats, the mating
of the casing halves and the shaft fitting. Synthetic
would not necessarily require a machining opera-
ut a metallic seal on the other hand would. As
the ball comprising hub 50 contains radially ex-
g supporting webs 52 supporting the spherical pe-
al surface 54 of the ball. The supporting webs are
d to define passages 58 and 60 in the rotating ball
er 56. As noted from the drawing, the seat 62 is
rted in the recess formed in the housing 64. Ex-
g conduit connections 66 may be formed integrally
he housing as desired. As noted in the drawings,
at does not employ backup springs as was disclosed
URES 1 through 5 but here again such provision
be dependent on the particular application. Owing
 sealing characteristics as provided by this inven-
urther reduction of weight and cost are realized by
ating the material forming the end closures of the
ıg. The face of the housing may contain struts 68
ng boss 71, which in turn carries the shaft 72. A
ıg 74 may be inserted between the shaft and inner
ter of the boss. As will be observed from FIG-
6, rotation of shaft 72 which rotates ball 56 to a
ermined angle positions passages of the ball out of
unication with ports 70 formed in the housing and
 portions of the spherical surface of the ball over
pening to effect the shutoff function. Thus, it will
oted that between every interconnecting position,
will be a shutoff position. While FIGURES 6 and
strate a two-position, four-ported valve, and FIG-
3 discloses three-position, four-ported valves, it is
understood and obvious to one skilled in the art
ıe number of ports and positions that the valves may
n, and therefore the actual routes of the passages
 the ball, will be determined by the particular appli-
 for which the valve is intended to be used.
ball type valve is particularly employed because it
s the advantage of being relatively simple, imposes
m loading on the seals producing a high effective-
of sealing, and manufacturing and assembling are
lerably facilitated.
at has been shown by this invention is a reliable,
e, low cost, and compact multi-position, multi-
d valve which is characterized as exhibiting high
g characteristics in both vacuum and pressure ap-
ions, having a combination of shutoff and various
nterconnecting functions.
s to be understood that the invention is not limited
to the specific embodiment herein illustrated and de-
scribed, but may be used in other ways without depart-
ing from its spirit as defined by the following claim.

I claim:

A fluid valve comprising a parallel piped shaped ported body portion formed from a pair of triangularly shaped casing members each having a semi-spherical cavity portion mating to define a spherical cavity portion, said casing members when assembled defining a parting plane extending diagonally through the housing, (a) a ball type member rotatably mounted in said spherical cavity portion,
   (1) said ball type member including a hub, a generally partially spherically contoured rim and web-like members supporting said rim to said hub,
   (2) said web-like members having passages terminating in said rim,
(b) a shaft carried by said ball projecting through an opening formed between said casing members,
(c) circular seat members each having an opening coextensive with said ports, and having a complementary partially spherically shaped recess adapted to engage the spherically contoured rim,
   (1) said contoured rim adjacent each of said passages dimensioned to have sufficient surface area to span said opening in the circular seat when said ball is rotated from an open position to a closed position,
(d) means for compressing said circular seats against said spherically contoured wall means so that said circular seat performs the combined function of sealing and being the sole support for said ball, and
(e) means engaging the projecting end of said shaft for imparting rotary movement to said ball for aligning said passages with the opening in said circular seat members.

References Cited by the Examiner

UNITED STATES PATENTS

| | | | |
|---|---|---|---|
| 715,113 | 12/02 | Mitchell | 251—315 XR |
| 1,299,586 | 4/19 | Leibing | 251—315 XR |
| 1,327,984 | 1/20 | Campbell | 251—315 |
| 2,475,702 | 7/49 | Funke | 137—625.47 XR |
| 2,663,538 | 12/53 | Bacchi | 251—315 XR |
| 2,698,731 | 1/55 | Koehler | 251—172 |
| 2,905,197 | 9/59 | Janes | 137—625.47 |
| 2,919,886 | 1/60 | Hurst | 251—315 XR |
| 3,101,752 | 8/63 | Martin | 137—625.23 XR |

MARTIN P. SCHWADRON, *Acting Primary Examiner.*

ISADOR WEIL, *Examiner.*